Figure 16:
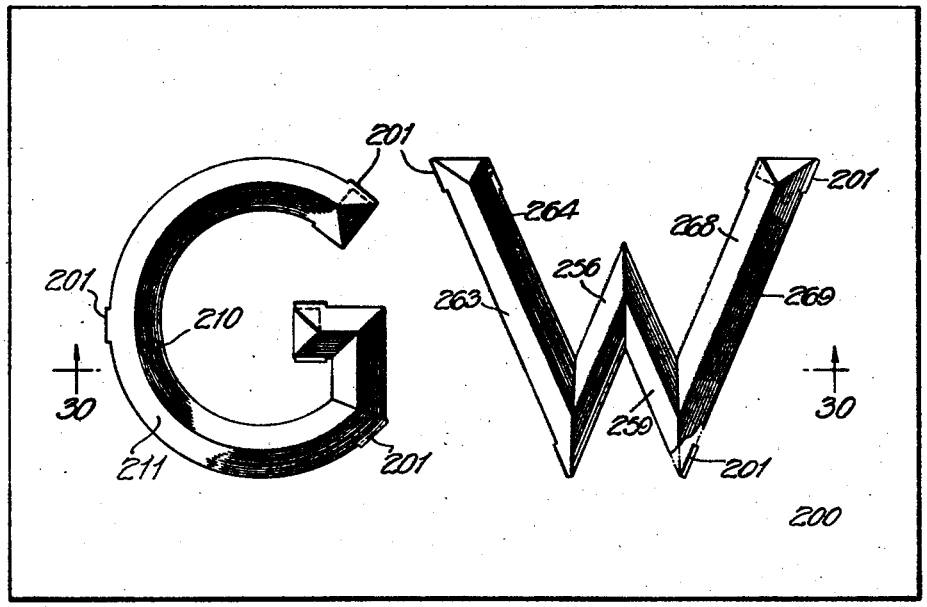

Jan. 2, 1940.   R. E. PAIGE   2,185,866
DISPLAY DEVICE
Filed April 21, 1938   5 Sheets-Sheet 1
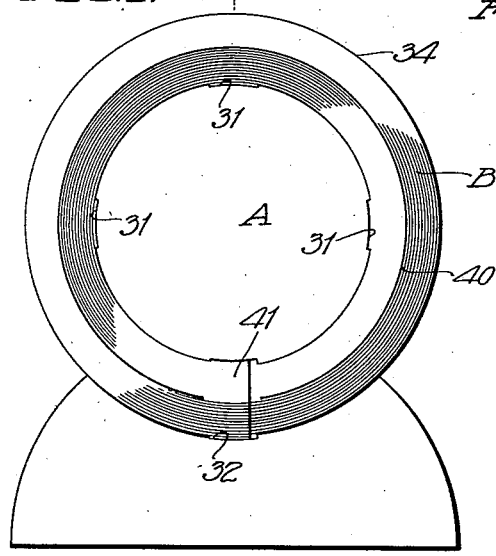
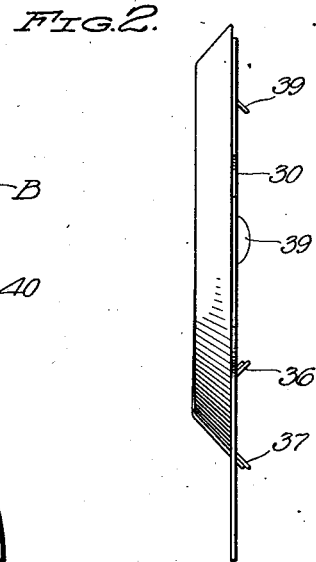
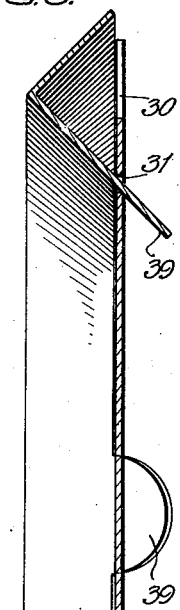
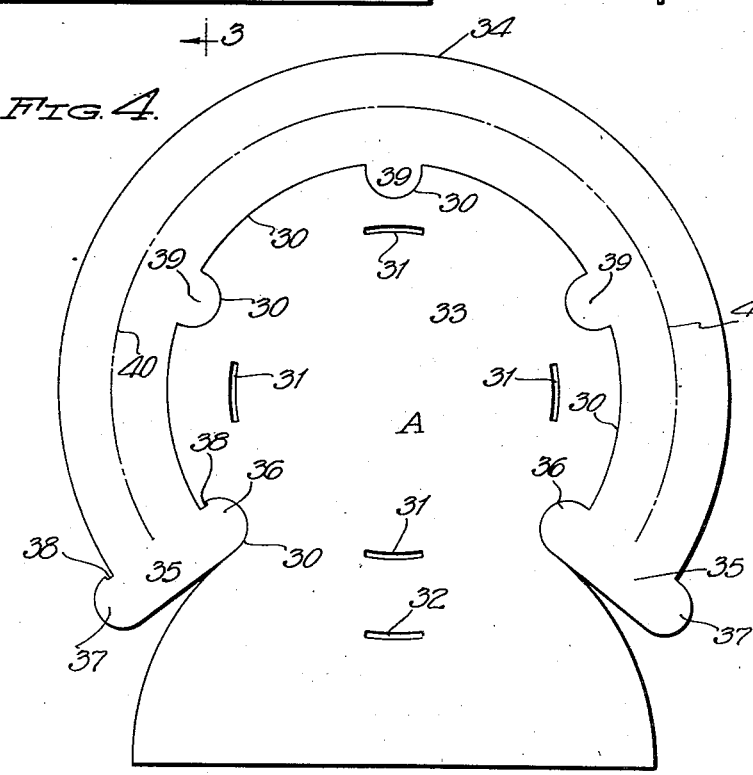
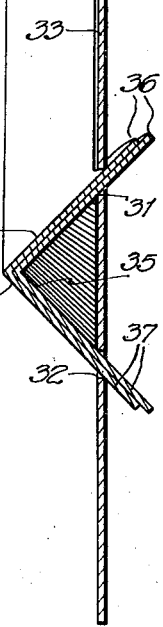
RICHARD E. PAIGE,
INVENTOR.
BY Ely Pattison
ATTORNEYS.
WITNESS:

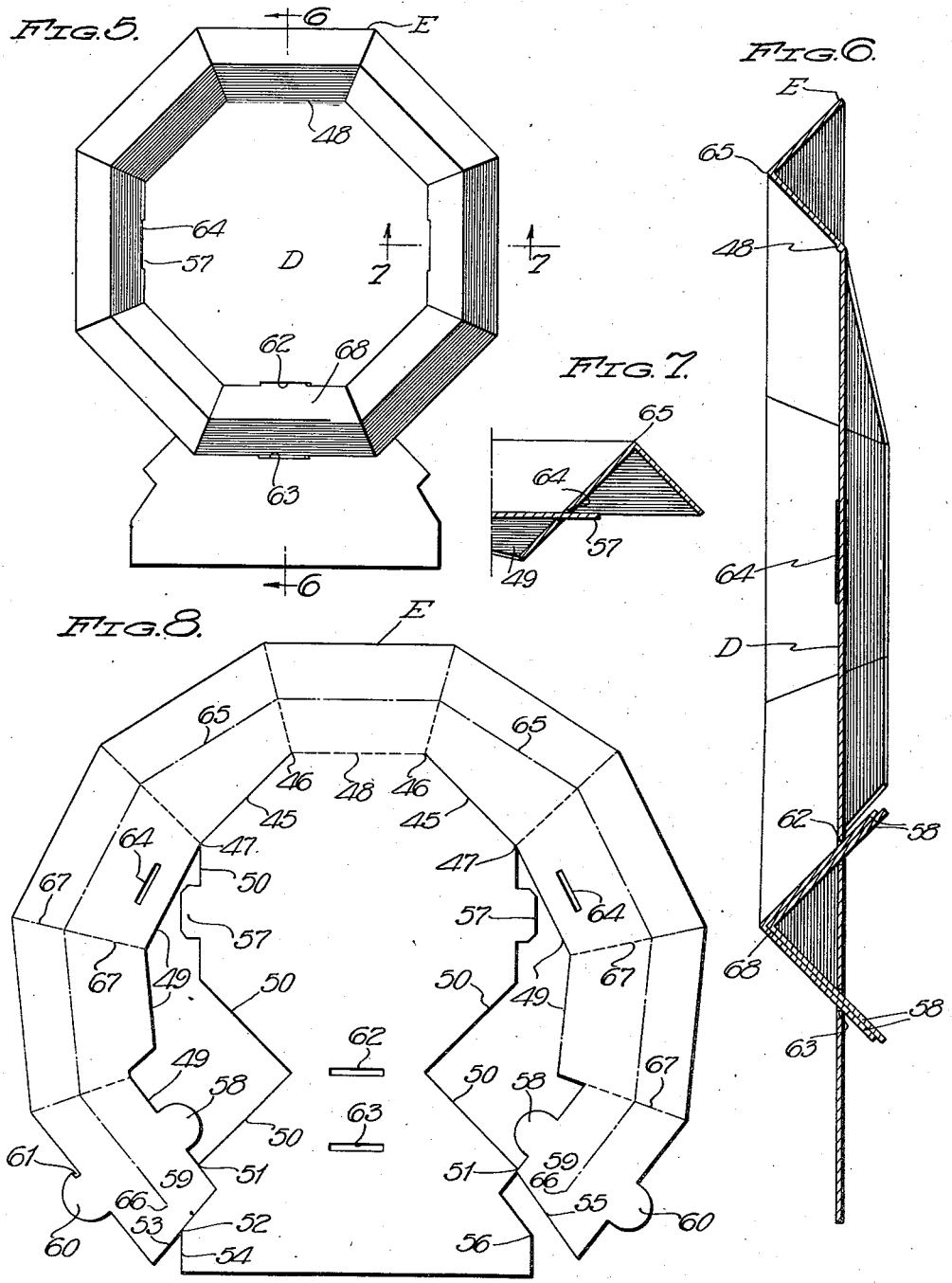
Jan. 2, 1940.   R. E. PAIGE   2,185,866
DISPLAY DEVICE
Filed April 21, 1938   5 Sheets-Sheet 2
RICHARD E. PAIGE,
INVENTOR.

Jan. 2, 1940.   R. E. PAIGE   2,185,866
DISPLAY DEVICE
Filed April 21, 1938   5 Sheets-Sheet 3
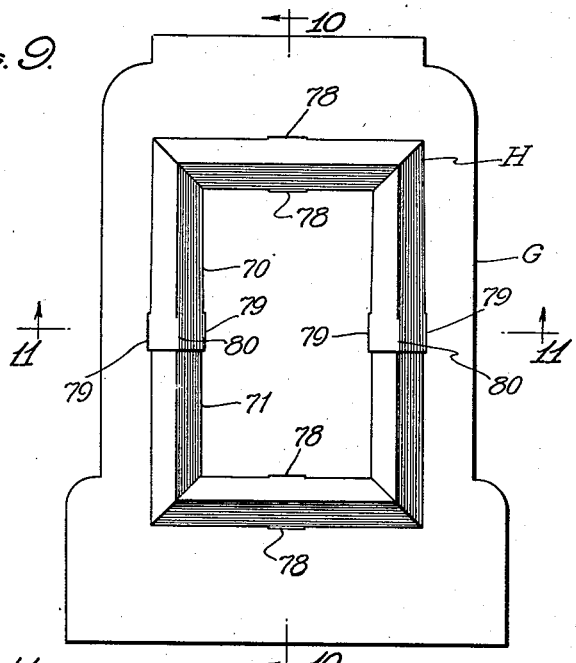
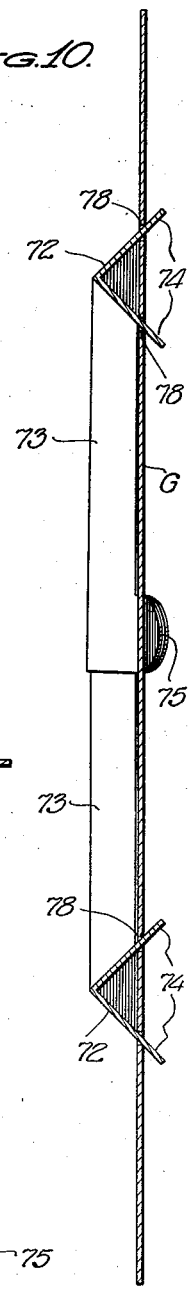
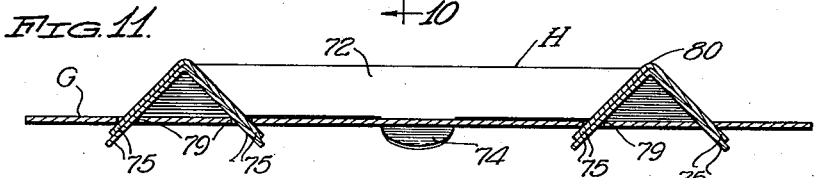
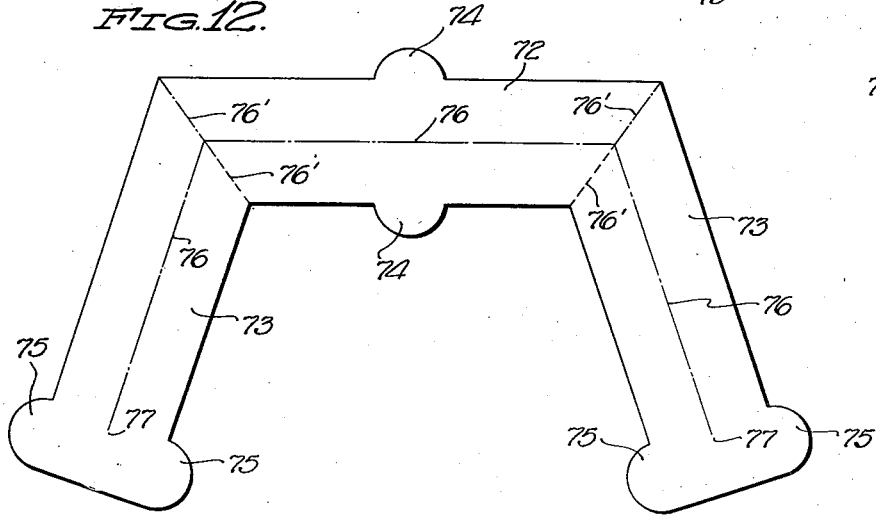
RICHARD E. PAIGE,
INVENTOR.
BY Ely Pattison
ATTORNEYS
WITNESS:

Jan. 2, 1940.   R. E. PAIGE   2,185,866
DISPLAY DEVICE
Filed April 21, 1938   5 Sheets-Sheet 4
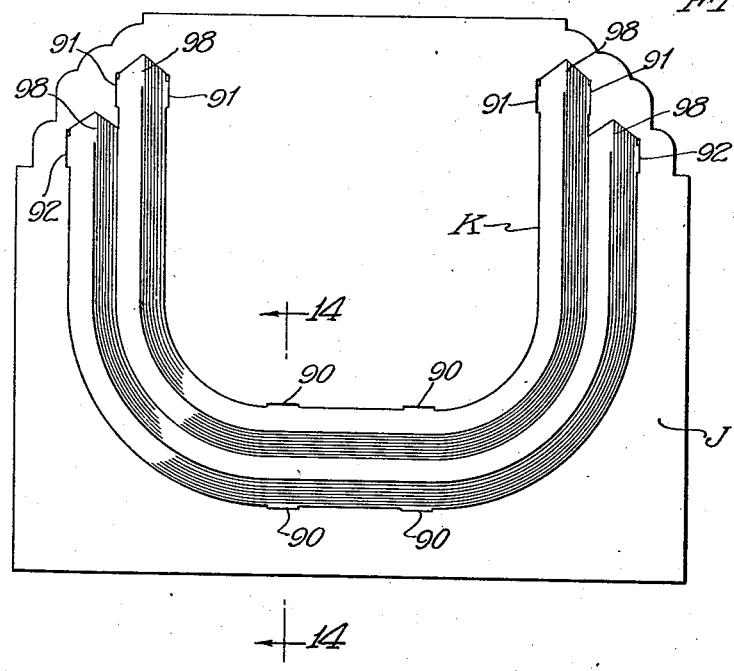
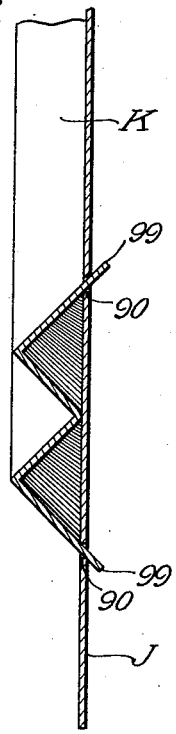
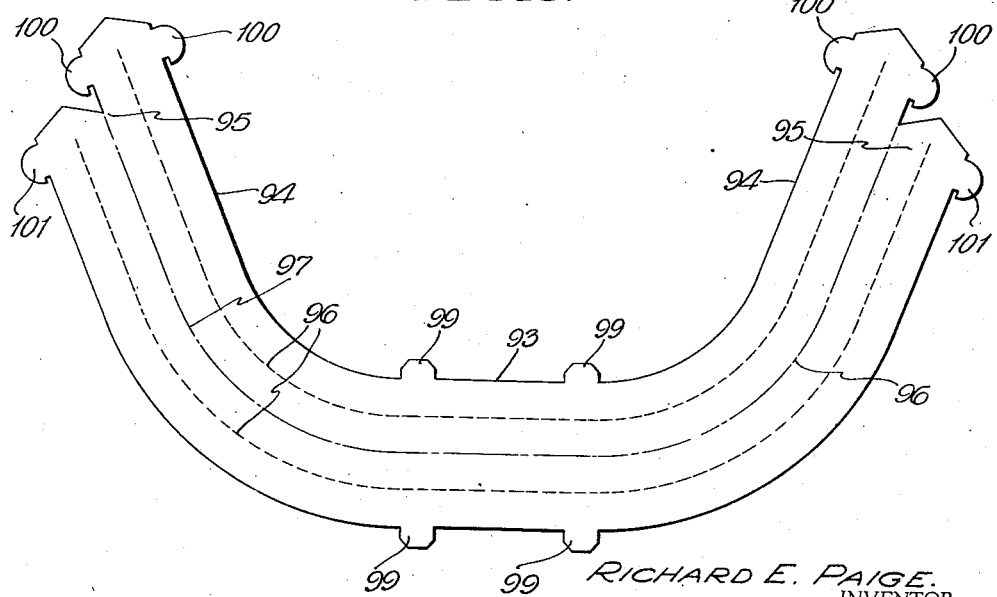
RICHARD E. PAIGE.
INVENTOR.
BY Ely Pattison
ATTORNEYS.
WITNESS:

Jan. 2, 1940.   R. E. PAIGE   2,185,866
DISPLAY DEVICE
Filed April 21, 1938    5 Sheets-Sheet 5

RICHARD E. PAIGE.
INVENTOR.
BY Ely Pattison.
ATTORNEYS.

Patented Jan. 2, 1940

2,185,866

UNITED STATES PATENT OFFICE 2,185,866

DISPLAY DEVICE

Richard Eaton Paige, Flushing, N. Y.

Application April 21, 1938, Serial No. 203,413

9 Claims. (Cl. 40—126)

This invention relates to new and useful improvements in display devices and more particularly it pertains to that type of display devices which are formed from paper, paperboard and the like.

It is an object of the invention to provide a new and novel display device of the type which may be set up and knocked down without damage to the parts thereof.

It is a further object of the invention, so to construct a display device that it may be readily and easily set up in display position from its knock-down form, thus greatly facilitating transportation and shipment of the display devices from their place of manufacture, to their point of ultimate use.

It is a further object of the invention to provide a novel and simple construction for producing framed effects in display devices.

A feature of the invention relates to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred forms and the following detailed description of the constructions therein shown.

Figure 17:
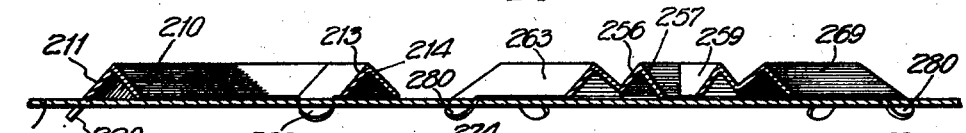
Figures 18, 19:
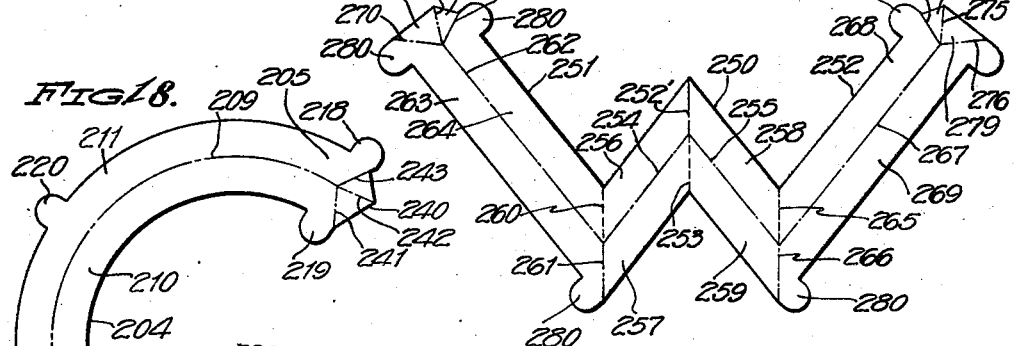

In the drawings:

Figure 1 is a view in elevation illustrating one embodiment of the present invention, Figure 2 is an edge view of the device illustrated in Figure 1, Figure 3 is a sectional view thereof on an enlarged scale, the section being taken substantially on the line 3—3 of Figure 1, Figure 4 is a plan view of the blank from which the device illustrated in Figures 1 through 3, inclusive, is formed, Figure 5 is a view in elevation of a modified form of the invention, Figure 6 is a sectional view on an enlarged scale taken substantially on the line 6—6 of Figure 5, Figure 7 is a detail fragmentary sectional view taken substantially on the line 7—7 of Figure 5, Figure 8 is a plan view of the blank from which that form of the invention illustrated in Figures 5 through 7 is formed, Figure 9 is a view in elevation illustrating a still further modified form of the invention, Figure 10 is a sectional view taken substantially on the line 10—10 of Figure 9, Figure 11 is a sectional view taken substantially on the line 11—11 of Figure 9, Figure 12 is a plan view of a blank from which one section of the device illustrated in Figures 9 through 11, is formed, Figure 13 is a view in elevation illustrating still a further modified form of the invention, Figure 14 is a fragmentary detail sectional view taken substantially on the line 14—14 of Figure 13, Figure 15 is a plan view of a blank from which one section of the device illustrated in Figure 13 is formed, Figure 16 is a view in elevation illustrating one manner in which the principle of the present invention may be applied to letters, Figure 17 is a transverse sectional view taken substantially on the line 30—30 of Figure 16, Figure 18 is a plan view of the blank from which one of the letters is formed, and;

Figure 19 is a plan view of the blank from which the other letter is formed.

Referring to the drawings by reference character and particularly to Figures 1 through 4, a display device constructed in accordance with the present invention comprises two elements A and B secured together with the element B superimposed upon the element A. The element B forms a frame-like member for a portion or area of the element A and in this form of the invention, is removably attached thereto.

In this form of the invention, both elements may be cut from a single blank of material with exceedingly little waste, by cutting the blank along the line designated 30 in Figure 4 to sever the blank and form the two elements A and B.

The element A is provided with a plurality of slots 31 arranged in a circular series, and also with a single slot 32 formed in spaced parallel relation with one of the slots 31. The element A forms the support for the element B and is provided with any suitable easel or prop not shown, to support the element A in display position.

The element B, in this form of the invention, is of circular form and provides a frame for a circular area of the element A, which area is designated 33 in the drawings. This element B consists of a main body portion 34 having free ends 35 and when cut from the blank, it is not of true circular form. When superimposed upon the element A, the element B is of substantially true circular shape, it being so formed by a drawing together of the free ends 35 thereof and interlocking the free ends in the slot 31 and the parallel adjacent slot 32 in the element A, the free ends 35 being provided with projecting tabs 36 and 37 for respective engagement in said slots 31 and 32. The tabs 36 and 37, on one of the free ends 35 are notched as illustrated at 38 in Figure 4 to provide for interlocking engagement with the ends of the slots in which these tongues engage to prevent accidental displacement of the tongues relative to their respective slots. The element B is also provided upon its inner edge with a plurality of tongues or tabs 39 so arranged with relation to one another, that when the element B is contracted, these tongues or tabs will be received in their respective remaining slots 31 and properly position the element B upon the element A.

To permit of contraction of the element B by drawing together the free ends 35 thereof without damage to the blank from which it is formed, the said blank is cut scored upon its front face as indicated by the broken line 40 in Figure 4. This score line 40 extends from a point closely adjacent one end of the element B to a point closely adjacent the other end thereof, the element B being crease scored from each end of the score line 40 to the corresponding end of the element B.

The two elements being severed from the blank, the element B is contracted by drawing together the two free ends 35 thereof as heretofore described, the free ends 35 being brought into overlapping relation as indicated at 41 in Figures 1 and 3 of the drawings.

When the free ends of the element B are drawn together, said element folds upon the cut score line 40 and is divided by said score line into two panels 42 and 43 which are angularly disposed to each other thereby giving the element B, a cross-sectional shape of substantially inverted V-form.

Drawing together of the free ends of the element B, produces tension in the body portion thereof and this tension performs two functions as follows: First, it operates to maintain the notches 38 in the tabs 36 and 37 in engagement with the ends of the slots in which they are engaged thus insuring against accidental displacement thereof and second, this tension materially strengthens the element B and permits of the use of a comparatively light stock where desired.

The two elements A and B are readily separable and in their separated relation, they occupy a flat condition for convenient shipment or other transportation.

The display device illustrated in Figures 5 through 8 of the drawings is of general octagonal form and consists of two elements D and E with the element E superimposed upon the element D when the device is set up for display purposes. In this form of the invention, however, the elements D and E are not separated but are instead, integrally connected as distinguished from the device illustrated in Figures 1 through 4.

The elements D and E are cut from a single blank of material as illustrated in Figure 8 of the drawings. The blank is cut along the lines 45 from the points 46 to the points 47 and between the points 46, the blank is crease-scored upon the line designated 48. From each point 47, the blank is cut along two lines designated 49 and 50 to a point designated 51 in the drawings. Upon one side of the blank, for example the left side in Figure 8, a single line of cut extends from the point 51 to the point 52, from which point 52, two lines of cut 53 and 54 extend to their respective edges of the blank. Upon the opposite side of the blank in Figure 8, two lines of cut 55 and 56 extend from the point 51 to their respective edges of the blank.

Cutting the blank as above described, divides the same into the two elements D and E and provides free ends 59 upon the element E. Such cutting of the blank also provides two projecting tongues or tabs 57 upon the element D and two projecting tongues or tabs 58 upon the element E, these last mentioned tongues projecting from the inner edges of the free ends 59 of the element E. Projecting tabs or tongues 60 are also formed upon the outer edges of the free ends 59 of the element E and one of these projecting tabs or tongues is notched as at 61 as shown at the left hand side of Figure 8.

The element D is provided with two slots 62 and 63, and the element E is provided with two slots 64, the purpose of all of which slots will be hereinafter specifically set forth.

To permit of a drawing together of the free ends of the element E without damage to the blank from which it is formed, the element E is cut-scored upon its front face along the line designated 65, which line extends from a point 66, closely adjacent each end of the element E, throughout the remainder of the length of the element E. From each of the points 66, the element E is crease-scored to the adjacent end of the said element E.

The element E is also crease-scored upon its front face along lines designated 67, which lines extend transversely of the element E.

In Figure 8, the device is shown in the blank or knock-down form. To set up the device in display position, it is only necessary to bring together into overlapping relation, the free ends 59 of the element E with that end which carries the notched tab 60, overlying the other free end as illustrated at 68 in Figures 5 and 6. In this position, the tabs 58 and 60 in the free ends 59 of the element E, will be received respectively in the slots 62 and 63, the tongues 57 passing into the slots 64. When the element is circumflexed in the manner described, it folds upon the several cut-scored and crease-scored lines 65 and 67, assuming a cross-sectional shape in the form of inverted V-form producing a highly ornamental effect. This circumflexion of the element E produces tension in said element, which tension, as in the heretofore described form of the invention, serves to maintain the notch 61 of the tab 60 in holding engagement with the end of the slot 63 with which it engages and also, by placing the element E under tension, it materially increases the strength thereof, thereby permitting of the use of a relatively lighter stock.

In Figures 9 through 12, I have illustrated still a further modified form of my invention in which there are two elements G and H, the member H forming a frame for a portion or area of the element G.

In this form of the invention, the element H is of rectangular shape and is constructed from two sections 70 and 71. Since the two sections 70 and 71 are of the same construction, the description of one of these sections will suffice.

As illustrated in Figure 12, each of these sections 70 and 71 consists of a main body portion 72 having angularly projecting extensions 73. Upon its opposite side edges, the main body portion is provided with tabs or ears 74 and each of the angular extensions 73 is provided upon its opposite side edges at the free end thereof, with tabs or ears 75.

The sections 70 and 71 are each cut-scored upon their front face as indicated by the line 76, which score extends to a point 77 closely adjacent the free end of each angular extension. From each point 77, the blank is preferably crease-scored to the end thereof. Also, the sections are crease-scored upon the lines designated 76' at angles to the cut-score line 76.

The element G is provided with a plurality of slots 78 and 79 arranged in pairs as illustrated in Figure 9, these slots being provided to receive the tabs or ears of the sections of the element H, in a manner to be hereinafter described.

In assembling the display, the free ends of the sections 70 and 71 of the element H are drawn together, which action causes a folding of the blank along the score lines 76 and 76', causing the blank to assume an angular cross-sectional shape of inverted V-form. When the blanks are so flexed, the tabs or ears 74 thereof are inserted in their respective slots 78 and the tabs or ears 75 are inserted in their respective slots 79, with the free ends of the sections, preferably the section 70, overlying the free ends of the section 71, as indicated at 80 in Figure 9.

As in the heretofore described forms of the invention, flexing the sections 70 and 71 places them under tension which tension retains the tabs or ears in their respective slots and also produces strength in the sections, thereby permitting of the use of relatively light stock where desired.

In Figures 13 through 15, I have illustrated a further modified form of my invention, in which form, the frame element is not continuous, or does not wholly enclose a portion, or area of the element upon which it is mounted.

The two elements in these Figures 13 through 15 are designated by the reference characters J and K, the element K forming a frame for a portion of the area of the element J. The element J is provided in its lower portion with a plurality of slots 90 arranged in pairs and near its upper edge at each side thereof, there is a plurality of slots 91 arranged one pair at each side of the element J, and closely adjacent each pair of slots 91, there is a slot 92.

The element K is formed from a flat blank of material of substantially U-form having a main body portion 93, and leg extensions 94, each terminating in a free end 95.

This element K is cut-scored upon its front face along a plurality of lines designated 96, these score lines extending longitudinally of the blank parallel with the side edges thereof. The blank is also crease-scored upon its rear face along the line designated 97, which line extends parallel to the cut-score lines 96 heretofore mentioned.

The cut-score lines 96 terminate slightly short of the free ends of the element and as illustrated at 98 in Figure 13, from the ends of the cut-score lines 97, to the end edge of the blank, the blank is crease-scored to permit of its bending in continuation of the cut-score lines.

The body portion of the element K is provided upon each of its side edges with two tabs or ears 99 and on each of its free ends, the element is provided with a pair of tabs or ears 100 and with a single tab or ear 101.

With the element K in the position in which it is illustrated in Figure 15, the two free ends thereof are drawn inwardly towards each other to contract the blank. When the ends are drawn towards each other to contract the element, the blank is flexed, folding upon the crease or score lines and taking on the cross-sectional form or shape illustrated in Figure 14. The element having been contracted to the desired degree, the tabs or ears 99 are inserted in their respective slots 90 in the element J. The free ends are retained in their indrawn position by engagement of the tabs or ears 100 and 101 in their respective slots 91 and 92 as illustrated in Figure 13, it being understood that the element K is superimposed upon the element J.

Flexing the blank by drawing the ends inwardly towards each other, produces a tension in the said element which acts to retain the several tabs or ears within their respective slots to retain the two elements J and K in their assembled relation. This tension, above referred to, also materially adds to the strength of the element K and permits of the use of a relatively light stock in the production thereof.

In Figures 16 through 19, I have shown the principle of the present invention embodied in a display device which employs letters in lieu of the frame like members heretofore described.

In Figures 16 and 17, the base or back member consists of a flat board 200 in which, in their proper position, slots or openings 201 are formed. It will be understood, that the number of slots or openings 201 employed and their relation to each other, will be determined by the nature of the character employed.

In the present embodiment of the invention, I have chosen by way of illustration, the letters "G" and "W", the former being illustrated in Figure 18, the latter being illustrated in Figure 19 and I will now describe the blanks from which these letters are formed and the manner of forming them.

Referring to Figure 18, the blank from which the letter "G" is formed comprises a curved body portion 204 which terminates at one end in a free extremity 205. The opposite end 206 of the curved body portion merges into an angular body portion 207 from which extends a second angular section 208. The curved body portion is creased or scored along the line designated 209 which line divides this portion of the blank into two panels 210 and 211 and extending through the angular section 207, there is a crease or score line 212 which divides this section of the blank into two panels 213 and 214. Extending through the angular section or portion 208, there is a crease or score line 215 which divides this section of the blank into two panels 216 and 217.

The end 205 of the curved body portion 204 has two tabs or ears 218 and 219, the former extending outwardly from the outer edge of the blank, while the latter extends inwardly from the inner edge of the blank. The outer edge of the main body portion 204 is also provided upon its outer edge with two tabs or ears 220 and 221. The angular section 208 has two ears or tabs 222 and 223 extending from its side edges, the former extending inwardly from the inner edge of the section, while the other projects outwardly from the outer edge thereof.

The angular section 207 is separated from the main body portion 204 by two crease or score lines 224 and 225, the former separating the panel 210 of the body portion 204 from the panel 213 of the angular section 207, while the latter separates the panel 211 of the main body portion from the panel 214 of the angular section 207.

The angular section 208 is separated from the angular section 207 by two crease or score lines 226 and 227, the former separating the panel 216 of the angular section 208 from the panel 213 of the angular section 207, while the latter separates the panel 217 of the angular section 208 from the panel 214 of the angular section 207.

Extending from the free end of the angular section 208, there is an angular section 228 and this angular section 228 is divided by a crease or score line 229, and this angular section 228 is separated from the angular section 208 by crease or score lines 230 and 231. Extending from the opposite end of the blank, there is an angular section 240 formed by the crease or score lines 241, 242 and 243 which extend angularly from the adjacent end of the crease or score line 209.

In Figure 19, I have disclosed the blank from which the letter "W" is formed and I will now describe this blank and the manner in which the letter is formed therefrom.

The blank comprises a main body portion 250 and projecting angularly from opposite sides of the main body portion 250, there are two legs 251 and 252. The main body portion is divided by two transversely extending crease or score lines 252' and 253 and two longitudinally extending score lines 254 and 255. These several score lines divide the main body portion into four panels 256, 257, 258 and 259.

The leg 251 is separated from the main body portion 250 by two crease or score lines 260 and 261 and this leg is divided into two panels 263 and 264, by the longitudinally extending score line 262. The leg 252 is separated from the main body portion 250 by two crease or score lines 265 and 266 and this leg is divided into two panels 268 and 269 by the longitudinally extending crease or score line 267. Extending angularly from the outer end of the crease or score line 262, there are three crease or score lines 270, 271 and 272 which divide the free end of the leg 251 into two sections 273 and 274, the purpose of which will be hereinafter described.

Extending angularly from the outer end of the crease or score line 267, there are three crease or score lines 285, 275 and 276 which divide the free end of the leg 252 into two sections 278 and 279.

The blank is provided with a plurality of ears or tabs 280 projecting from the edges thereof, these ears or tabs being properly positioned to be received in their respective slots 201 when the blank is placed in display position upon the back or base member 200.

The blanks are positioned upon the base or back member 200 by drawing the free ends of the blanks together, and flexing each blank upon its crease or score lines to place the blank under tension. Upon flexing the blanks, they fold upon their crease or score lines and assume a cross-sectional form which is of inverted V-shape, as illustrated in Figure 17 of the drawings.

When the blank illustrated in Figure 18 is flexed in the manner described above, the angular sections 228 and 240 fold inwardly of the blank to close their respective ends of the letter and this is also true of the sections 273, 274, 278 and 279 upon the free ends of the blank illustrated in Figure 19.

In their flexed condition, the blanks are positioned upon the base or back member 200 and the several tabs or ears carried by the blanks are inserted into their respective slots or openings 201 to secure the blanks, in the form of letters, to the said base or back member 200, at the same time, retaining the blanks in their flexed form under tension.

Throughout the description, I have many times referred to cut-scores and crease-scores, but I wish it understood that I do not wish to be limited to any particular method of scoring since the method employed depends wholly upon the weight and type of stock employed. For example, when heavy stock is employed, it is practically necessary to employ cut-scores. However, when lighter stock is employed, crease-scoring may be all that is necessary to produce the desired effect. Furthermore, I have described the invention as employing a stock which would require some cut-scoring. However, by reason of the added strength which is imparted to the finished device by reason of the tension produced by flexing of the elements as described, I am able to employ a relatively light stock and I therefore wish it understood that the invention is not limited to any particular type of stock and that the scoring or creasing may be of any type, dependent only upon requirements as imposed by the type of stock selected.

From the foregoing, it will be readily apparent that the accompanying embodiments of the invention represent devices in which the several objects recited are accomplished and while the invention is herein illustrated in several different forms and types of display devices, it is to be understood that it is not to be limited to those forms herein illustrated and that it may be practiced in such other forms as fall within the scope of the appended claims.

Having thus described the invention, what is claimed as new, is:

1. A display device comprising in combination, a back member and a separate frame member superimposed thereon, said frame member comprising a scored or creased normally flat blank adapted to fold upon its score or crease lines to a shape of angular cross-sectional form, and means carried by the base marginal edge of the separate frame member and having removable attachment with the other of said members for securing the two members together and for retaining the frame member in its folded form.

2. A two element display arranged with one display element in superimposed relation with the other, one of said display elements comprising a flat blank of material having a plurality of openings disposed therein, the other of said display elements comprising a normally flat blank of material having a portion thereof removed to form spaced free ends adapted to be drawn towards each other to produce a flexing of the blank, crease or score lines extending through the blank of the second mentioned display element and providing lines of fold for the blank when the free ends thereof are drawn towards each other to flex the blank, and means for securing the second mentioned display element to the first mentioned display element and maintaining a flexed condition in the second mentioned display element.

3. A framed display device comprising in combination a back member and a separate frame member, said back member being substantially flat and having a plurality of openings therein, said frame member being normally flat and contractable, and tongues carried by the frame member for holding engagement in the openings in the back member to secure the frame member to the back member with the frame member in a contracted state, said tongues also serving to retain the frame member in its contracted state.

4. A display device comprising a back member and a display element adapted to be secured thereon, the back member comprising a flat blank having a plurality of slots or openings therein, the display element comprising a normally flat blank of material, crease or score lines extending through the blank upon which the blank may be flexed to throw the blank into angular cross-sectional form presenting angularly related panels, and tabs extending from the outer side edges of said angularly related panels for reception in the slots or openings of the back member, said tabs when engaged in the openings in the back member, serving to retain the display element in its flexed condition to maintain the said panels in angular relative positions.

5. A display device comprising a back member and a display element adapted to be secured thereon, the back member comprising a flat blank having a plurality of slots or openings therein, the display element comprising a normally flat blank of material, crease or score lines extending through the blank upon which the blank may be flexed to throw the blank into angular cross-sectional form presenting angularly related panels and to produce tension in the blank, and tabs extending from the outer side edges of said angularly related panels for reception in the slots or openings of the back member, said tabs when engaged in the openings in the back member, serving to retain the display element in its flexed condition to maintain the said panels in angular relative positions with the tension produced in the flexed member serving to retain said tabs in interlocking engagement with their respective slots or openings.

6. A display device comprising a back member and a display element adapted to be secured together with the display element superimposed upon the back member, the back member comprising a flat blank having a plurality of slots or openings therein, the display element comprising a normally flat blank of material having relatively narrow extensions projecting therefrom, a crease or score line extending longitudinally of the blank of the display element and providing means upon which the blank may be flexed by movement of the extensions towards each other thereby to throw the blank into angular cross-sectional form presenting angularly related panels, and tabs extending from the side edges of said panels for engagement with the slots or openings of the back member for retaining the display element in position upon the back member.

7. A display device comprising a back member and a display element adapted to be secured together with the display element superimposed upon the back member, the back member comprising a flat blank having a plurality of slots or openings therein, the display element comprising a normally flat blank of foldable material, elongated extensions projecting from said blank, a crease or score line extending through said blank and longitudinally of the extensions thereon upon which the blank may be flexed upon movement of the extensions in a direction towards each other thereby to throw the blank into angular cross-sectional form presenting angularly related panels, and tabs extending from the sides of said panels at the ends thereof for engagement within the aforementioned slots of the back member to retain the display element in position upon the back member.

8. A display device comprising a back member and a separate display element adapted to be secured together with the display element superimposed upon the back member, the back member comprising a flat blank having a plurality of slots or openings therein, the display element comprising a normally flat blank of foldable material, elongated extensions projecting from said blank, a crease or score line extending through said blank and longitudinally of the extensions thereof upon which the blank may be flexed upon movement of the extensions in a direction towards each other thereby to throw the blank into angular cross-sectional form to present angularly related panels and to produce tension in the blank, and tabs extending from the side edges of the said angularly related panels at the free ends of the extensions and intermediate of the free ends thereof for engagement in the slots or openings in the back member for securing the display element upon the back member.

9. A display device comprising a back member and a display element adapted to be secured together with the display element superimposed upon the back member, the back member comprising a flat blank having a plurality of slots or openings therein, the display element comprising a normally arcuate shaped blank of material, a crease or score line extending longitudinally through the blank upon which the blank may be flexed to bring its free ends together in overlapping relation to throw the blank into angular cross-sectional form presenting angularly related panels, and tabs extending from the side edges of said panels adjacent each end thereof for engagement with the slots or openings of the back member to retain the ends of the display element in overlapped relation and attach the display element to the back member.

RICHARD EATON PAIGE.